Dec. 31, 1957 C. T. COLLIANDER 2,817,917
CARTRIDGE LIFTER BIASED BY SPRING WITH TOGGLE ACTION
Filed July 30, 1954 5 Sheets-Sheet 1

INVENTOR.
Carl T. Colliander
BY
Steward & Sprnegel
his Attorneys

Dec. 31, 1957     C. T. COLLIANDER     2,817,917
CARTRIDGE LIFTER BIASED BY SPRING WITH TOGGLE ACTION
Filed July 30, 1954     5 Sheets-Sheet 2
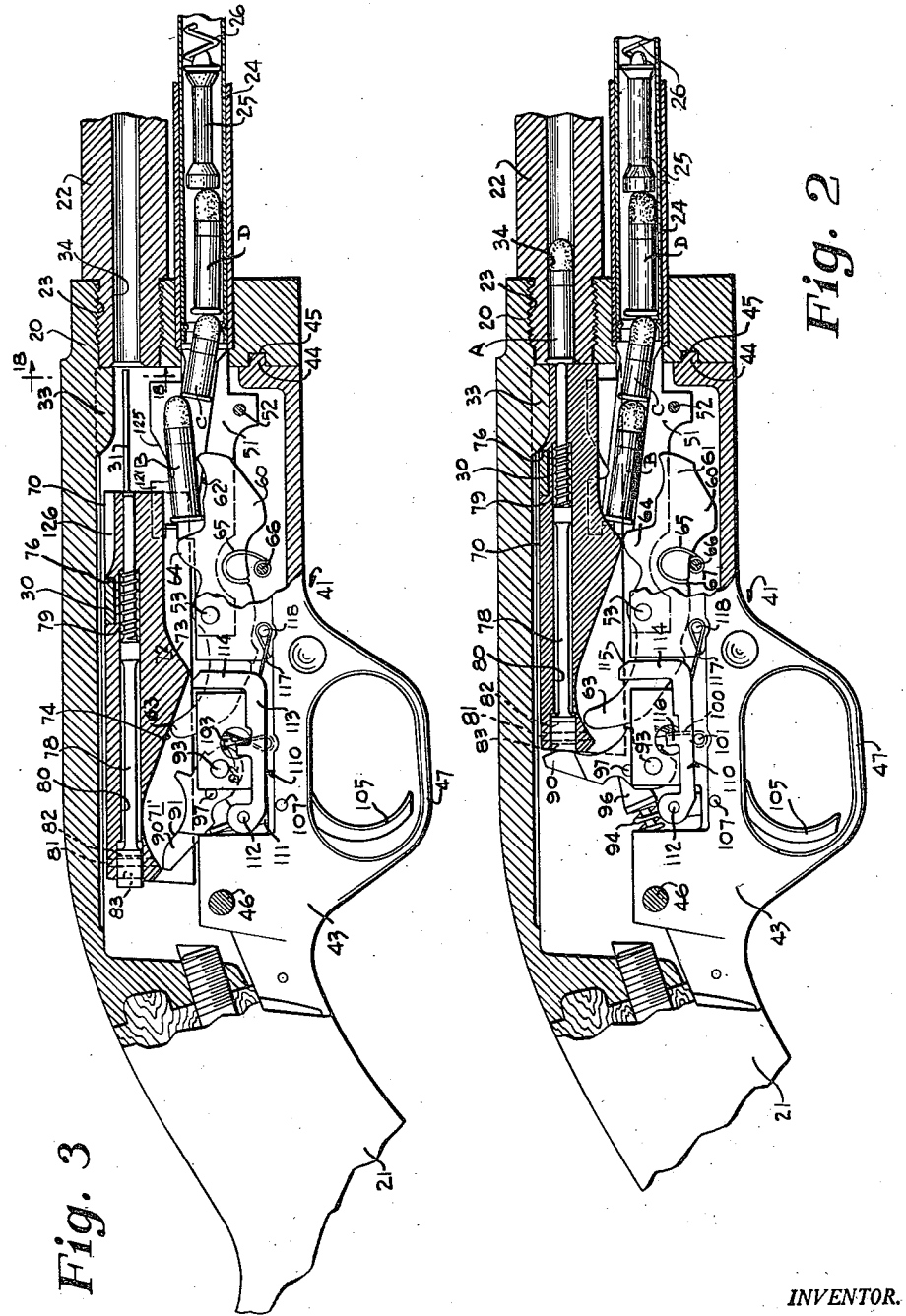
INVENTOR.
Carl T. Colliander
BY
his Attorneys Dec. 31, 1957     C. T. COLLIANDER     2,817,917
CARTRIDGE LIFTER BIASED BY SPRING WITH TOGGLE ACTION
Filed July 30, 1954     5 Sheets-Sheet 3
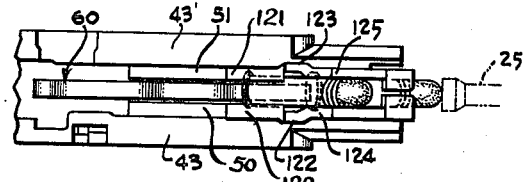
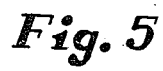
Fig. 5
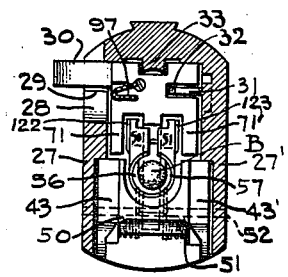 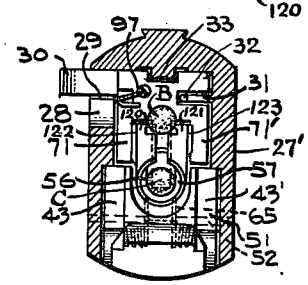 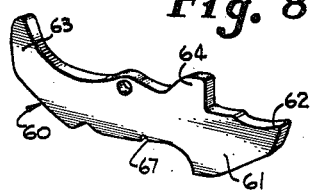
Fig. 6     Fig. 7     Fig. 8
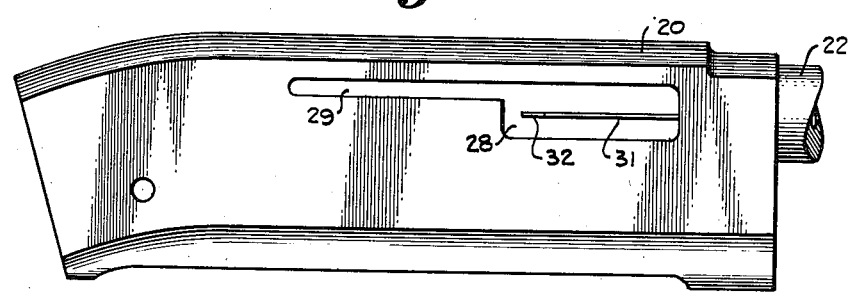
Fig. 9
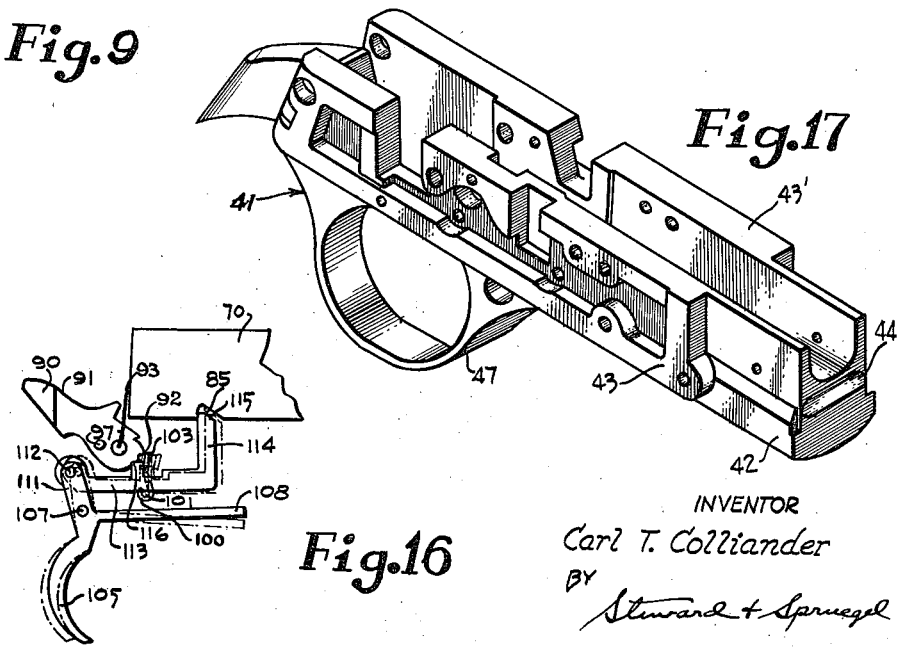
Fig. 16     Fig. 17
INVENTOR
Carl T. Colliander
BY
Steward + Spruegel
his Attorneys Dec. 31, 1957     C. T. COLLIANDER     2,817,917
CARTRIDGE LIFTER BIASED BY SPRING WITH TOGGLE ACTION
Filed July 30, 1954     5 Sheets-Sheet 4

INVENTOR.
Carl T. Colliander
BY
Steward + Sprueyl
his Attorneys

Dec. 31, 1957      C. T. COLLIANDER      2,817,917
CARTRIDGE LIFTER BIASED BY SPRING WITH TOGGLE ACTION
Filed July 30, 1954      5 Sheets-Sheet 5
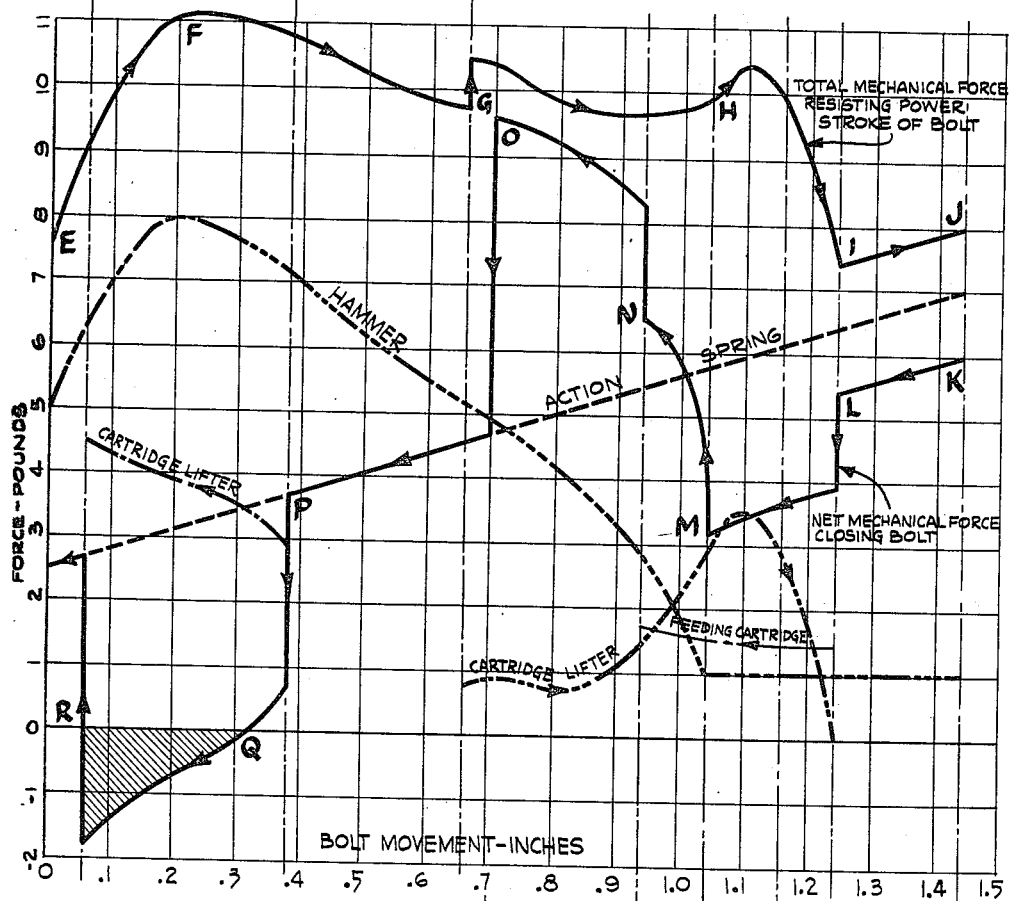
INVENTOR
Carl T. Colliander
BY Steward + Sprugel
his ATTORNEYS.

2,817,917

CARTRIDGE LIFTER BIASED BY SPRING WITH TOGGLE ACTION

Carl T. Colliander, West Cheshire, Conn., assignor of one-half to The High Standard Manufacturing Corporation, Hamden, Conn., a corporation of Connecticut, and one-half to Sears, Roebuck and Co., Chicago, Ill., a corporation of Illinois Application July 30, 1954, Serial No. 446,905

1 Claim. (Cl. 42—17)

The present invention relates in general to firearms, and more particularly to an improved semi-automatic rifle of the tubular magazine type.

So far as I am aware, the only firearms heretofore known which utilize a blow-back action, and which are capable of semi-automatically firing cartridges of varying power without substituting parts to compensate for the variation in power, have been provided with an actuator or "floating chamber," carried in a counterbore at the breech end of the barrel, by which a variation in the effective contact area is made whereby the gas pressure developed by an exploding cartridge may be applied to a larger surface when firing a low-power cartridge, such as a .22 caliber short, than when firing a higher power cartridge, such as a .22 caliber long rifle. With such an actuator the total energy imparted to the bolt can be made to be roughly the same no matter which type of ammunition is used, so that the rifle will operate with cartridges of varying power.

Rifles utilizing an actuator are subject to two serious drawbacks, however. First, when the gun is fired over a period of time, products of combustion build up in the counterbore, causing the actuator to stick, in which condition it will no longer operate semi-automatically with low-power ammunition. Even when the counterbore is not sufficiently fouled to cause the actuator to stick, deposits may be sufficient to prevent the actuator from becoming fully seated in the counterbore. This allows the action to remain open slightly and, when .22 long or long rifle cartridges are used, explosion of the cartridge results in expansion of the fired case at the break between the end of the actuator and the barrel, preventing the extractor from pulling the fired case from the chamber. Since it is difficult to clean the counterbore and actuator, the average gun owner must take the gun to a shop having specialized equipment to return it to operative condition.

A second rather serious drawback in an actuator-equipped rifle results from the fact that the total energy imparted to the bolt is roughly the same, so that the speed of the bolt is about the same, no matter what power ammunition is used. When .22 shorts are fired, this results, in most instances, in premature separation of the spent case from the chamber, with consequent flashing of burning powder through the ejection port, and flash-back of hot gases toward the shooter's face and hand.

The chief difficulty in designing a rifle, without an actuator, i. e. one having a constant effective contact area upon which the expanding gases act, but which is still capable of indiscriminately firing semi-automatically both high and low power ammunition, resides in the fact that if the action is made light enough to operate in a satisfactory manner when using low-power ammunition, higher power cartridges will cause the bolt to reciprocate in the receiver at such a high speed that conventional cartridge-feeding devices do not operate fast enough to place a cartridge in feed position before the bolt, in its return motion, has reached cartridge contacting position. This will either cause jamming of the bolt, or will allow the bolt to return to breech-closing position without picking up a new cartridge. Moreover, at very high bolt return speeds, even if the cartridge is placed in feeding position prior to the return of the bolt, the bolt may strike the cartridge with such force, as to cause it to tumble, and jam in the breech.

Conversely, if the action is made heavy enough to slow down the operation sufficiently to allow the feed mechanism to place a cartridge in feeding position before the return of the bolt, a low-power cartridge usually will not impart sufficient energy to the bolt to permit it to cock the firing mechanism as well as to extract the old shell and to chamber a new cartridge.

It has been generally felt by those skilled in the art that it is totally impractical, if not impossible, to design a rifle capable of satisfactorily firing .22 caliber long rifle cartridges, which would also fire .22 shorts without any change whatever in the gun and, without the provision of an actuator of some sort to assist in actuation of the gun when a short cartridge is fired. I have found, however, that this general feeling is not justified and that the resistance or inertia opposing the blow-back forces executed by these standard cartridges can be selected so that the gun will function properly when either a .22 long rifle or short cartridge is fired. This is important in that it permits the actuator used heretofore for this purpose to be eliminated and does away to a large extent with the troublesome disadvantages of frequent cleaning and flash-back found in actuator-equipped rifles as noted hereinabove.

It therefore is a primary object of this invention to provide a rifle capable of firing indiscriminately cartridges of both high and low power without adjustment of any parts of the rifle to compensate for varying forces applied to the bolt by the firing of cartridges of varying power.

Another object of the invention is to provide cartridge feeding means which is operable to feed cartridges of different length positively and rapidly to cartridge feeding position in order to permit faultless loading of the cartridges into the firing chamber by the bolt which may travel at extremely high speeds.

These and other objects of the invention, as well as novel features and advantages, will become further apparent from the description of one embodiment of the invention in its most advantageous form illustrated in the accompanying drawings, in which:

Fig. 2 is a side elevation, partially in cross-section, showing the parts of the action assembly as they appear immediately after the trigger has been pulled but before the bullet has left its cartridge case and before the bolt has commenced its rearward travel;

Fig. 3 is a side elevation, partially in cross section, showing the parts of the action assembly as they appear when the bolt is in an intermediate position during its rearward travel;

Fig. 5 is a top plan view of the elevator and throat assembly with a cartridge held therein in position to be forced into the cartridge chamber;

Fig. 6 is a cross sectional view of the bolt and throat assembly taken along the line 6—6 of Fig. 1;

Fig. 7 is a cross sectional view of the bolt and throat assembly taken along the line 7—7 of Fig. 4;

Fig. 8 is a perspective view of the cartridge elevator;

Fig. 9 is a side elevational view of the receiver with the action assembly removed;

Fig. 16 is a detail view of the hammer, sear, and disconnector assembly;

Fig. 17 is a perspective view of the trigger-plate;

Fig. 19 is a graphical representation showing the various forces which are required to move the bolt at slow speed.

Figure 4:
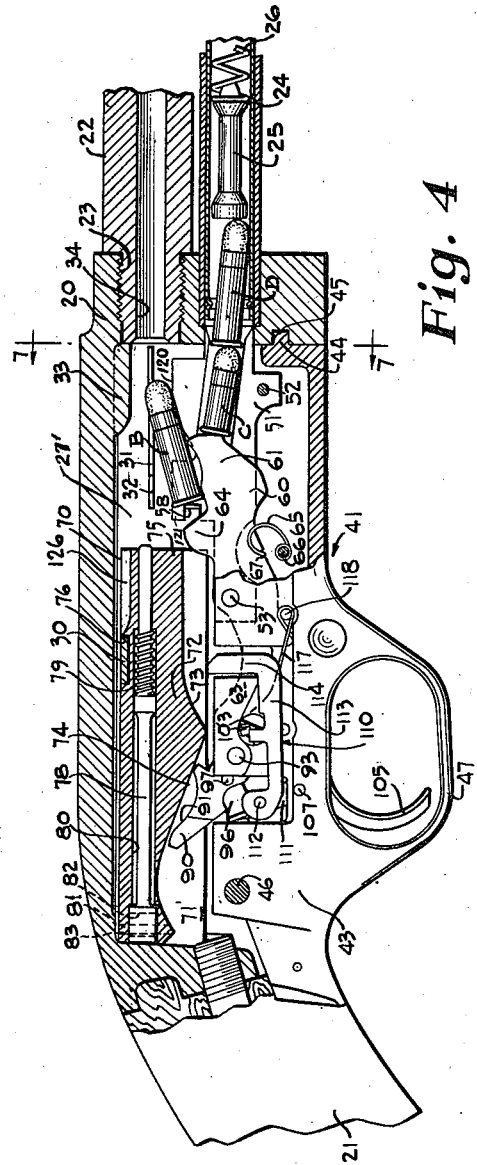
Fig. 4 is a side elevation, partly in cross section, showing the parts of the action assembly as they appear when the bolt has reached the end of its rearward travel.

Referring to Figs. 1 through 7, and 9, it will be observed that receiver 20 is cradled in stock 21, and barrel 22 is secured to the forward end of receiver 20 as by screwing into socket 23. A tubular magazine 24, lying in a plane parallel to that of barrel 22, communicates with receiver 20 at a point below the barrel, and is provided with a cartridge follower 25 biased toward cartridge-feeding position by spring 26. One of the walls 27 of receiver 20 is pierced by a port 28 (see Figs. 6 and 9) through which a spent cartridge casing may be discharged, and is provided with a slot 29 extending rearwardly from port 28 to accommodate bolt handle 30 during reciprocatory movement of the bolt, as will be hereinafter described. The opposite wall 27' of receiver 20 carries ejector rail 31 (Figs. 4, 6 and 7) which is provided with a shoulder 32 for contacting the base of a cartridge case during rearward motion of the bolt, whereby to eject it through port 28. Guide block 33, for guiding the nose of a cartridge from the cartridge feeding means hereinafter described into the chamber 34, is positioned at the top of receiver 20 adjacent to the chamber, which, as may be observed especially well in Fig. 4, is beveled to facilitate entry of a cartridge therein.

A frame (see Fig. 17), sometimes referred to in the art as a trigger-plate, indicated generally at 41, consists of a base plate 42 and upstanding side walls 43 and 43', and as shown in Figs. 1–4, is secured in place in the receiver 20 by tongue 44, fitted into groove 45, in the forward end of receiver 20, and adjacent its rear, by a machine screw 46, passing through holes in the walls 27 and 27' of receiver 20, and through holes in the walls 43 and 43' of frame 41. A trigger guard 47 is formed integrally with the base plate 42, and depends therefrom.

Figure 13:
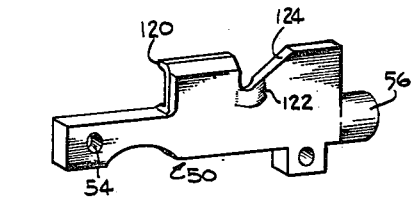
Fig. 13 is a perspective view of the exterior of the right-hand throat member.
Figure 14:
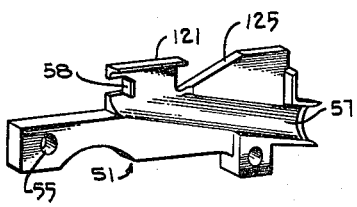
Fig. 14 is a perspective view of the interior of the left-hand throat member.

Trigger-plate 41 carries the operative parts of the action assembly, which include the cartridge-guiding assembly, an elevator, the hammer and sear assembly, and the trigger and disconnector assembly. The cartridge-guiding assembly is carried in the front portion of trigger-plate 41 adjacent the magazine 24, and comprises left and right throat members 50 and 51, respectively, which are loosely attached to the inner sides of walls 43 and 43' of frame 41 at their lower front portions as by screws 52, and are supported at the rear by pin 53 passing through openings 54 and 55 (see Figs. 13 and 14), the latter being of sufficient size to permit loose motion of the members 50 and 51 on pin 53. Throat members 50 and 51 are provided with guide sections 56 and 57 in the shape of tube segments, the forward end of the guide sections being so placed as to receive therebetween a cartridge from magazine 24, and to guide it to the position shown in Figs. 1 and 6, further rearward motion of the cartridge, under the urging of cartridge follower 25, being prevented by stop lug 58, carried by left hand throat member 51. For a more detailed description of the general arrangement of throat members similar to those illustrated herein, reference is made to the patent to Humeston 2,552,429.

Cartridge lifter 60 is pivotally carried on pin 53, and is located between throat members 50 and 51, as may be more particularly observed in Fig. 5. Lifter 60 has a forwardly extending arm 61 (Figs. 1 to 4, and 8), which is adapted to engage a cartridge when the latter is in the position shown in Fig. 1, and lift it to a position ready for chambering, as shown in Fig. 4. Arm 61 is provided with an arcuate cartridge guiding face 62 for guiding the base of a cartridge, such as cartridge B, as it moves toward the chamber 34 during the feeding operation hereinafter described. Lifter 60 also has a rearwardly and upwardly extending finger section or first operating element 63, and an upwardly extending cam lobe or second operating element 64, the latter being located on the rear upper surface of arm 61, slightly forward of pin 53. A spring 65, mounted on pin 66, engages notch 67 on the lower edge of lifter 60, the notch 67 being so located that as the lifter arm is raised and lowered, it will pass the center line between pins 53 and 66, whereby the spring 65 may exert a toggle action on lifter 60 to cause it to snap quickly from one limiting position to another. Arm 61 is so shaped that when it is in down position its upper surface will be below the guide sections 56 and 57 of the throat members, and finger section 63 is of a size and shape such that it will lie below the top of the frame walls 43 and 43' when the lifter is in the position shown in Fig. 4, but will extend above the walls 43 and 43' at least in part, when the lifter is in the position shown in Fig. 1.

Figure 10:
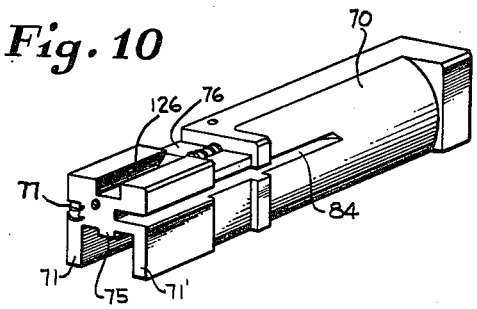
Fig. 10 is a perspective view of the bolt assembly.
Figure 18:
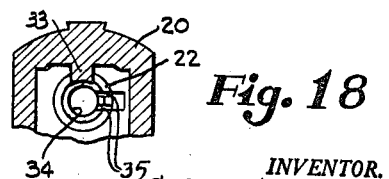
Fig. 18 is a cross-sectional view along the line 18—18 of Fig. 3, showing the rear face of the cartridge chamber, the lower portion of the receiver being broken away.

Bolt 70 is reciprocable in receiver 20, its rails 71 and 71' (Fig. 10) riding on the top of walls 43 and 43' of the frame or trigger-plate 41. A cam track 72 (Figs. 2–4) is cut into the under side of the body of bolt 70 between rails 71 and 71', and has intermediate its extent a high point which presents a forward cam face 73 adapted to engage cam lobe 64 of lifter 60 during forward motion of bolt 70, whereby to depress arm 61, and a rear cam face 74 adapted to contact finger section 63 during the rearward motion of bolt 70, in order to raise arm 61 of the lifter. The forward end of cam track 72 presents a shoulder 75 (Fig. 10) adapted to engage the base of a cartridge, for example cartridge B, held between throat members 50 and 51 in the position shown in Fig. 4, during forward travel of the bolt, whereby to force the cartridge into chamber 34. Bolt 70 is provided with a slot 76 on its upper surface to accommodate bolt handle 30, and it likewise carries a cartridge extractor 77 (see Figs. 1 and 10). Extractor 77 is a double pronged hook mounted in the usual manner on the right side of the bolt adjacent the ejection port in the receiver and extending forwardly of the bolt, as best shown in Fig. 10. The beveled face of cartridge chamber 34 is provided with two narrow slots 35 (Fig. 18) adapted to receive the prongs of extractor 77 when the bolt is completely closed.

The provision of slots 35 instead of the wide recess usually found in rifles of this type substantially reduces malfunctioning of the gun by preventing jamming of the nose of the cartridge against the extractor recess as it is being fed into chamber 34. This is particularly important in the present instance because of the difficulty involved in feeding cartridges of different lengths. While long cartridges are positively guided into the chamber at all times during their travel from the magazine to the chamber, the noses of short cartridges are necessarily free, though properly directed of course, during a short distance of travel just before they enter the chamber. Consequently, if the nose of a cartridge should strike the side of the chamber adjacent the slots 35, these slots are not wide enough to interfer with the passage of the cartridge into the chamber. It has been found, on the other hand, that the usual wide extractor recess sometimes caused the gun to jam.

Firing pin 78, rearwardly biased by spring 79, is carried in bore 80 in bolt 70, and is held therein by retaining pin 81, which contacts shoulder 82 of notch 83 in the head of the firing pin. A channel 84, on the lefthand side of the bolt 70, accommodates ejector rail 31. A notch 85 (see Figs. 1 and 16) is cut in rail 71 of the bolt for a purpose to be hereinafter described. The bolt is normally biased to breech closing position by return spring 86, guided by return spring rod 87, one end of which is seated in the rear of receiver 20, the other end extending into a passage 87' drilled longitudinally into the rear of the bolt (Fig. 1).

Figure 11:
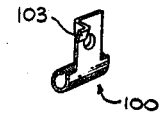
Fig. 11 is a perspective view of the sear.
Figure 12:
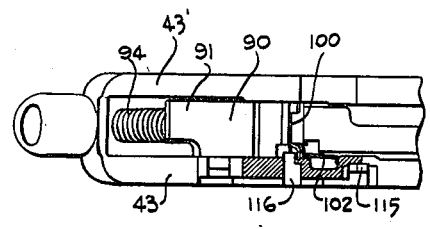
Fig. 12 is a plan view of the hammer and sear assembly in cocked position.

The firing mechanism comprises the hammer and sear assembly, and the trigger and disconnector assembly. Hammer 90, provided with striking face 91 and sear notch 92 is pivotally mounted on pin 93, which passes through walls 43 and 43' of trigger-plate 41, and is biased toward firing position by spring 94, guided by rod 95, the latter having a notched head portion 96 which engages pin 97 carried by hammer 90 (see Fig. 1). Sear 100 is carried by pin 101, and is urged into engagement with sear notch 92 by spring 102 (Fig. 12). The sear 100 is also provided with sear arm 103, which extends forwardly and outwardly from the upper portion thereof as best seen in Fig. 11, arm 103 being arranged for engagement by a disconnector when the trigger is pulled as will be more fully described hereinafter.

Figure 15:
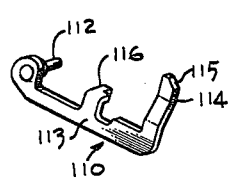
Fig. 15 is a perspective view of the disconnector.

Trigger 105 passes upwardly through an opening 106 in base plate 42 at the top of the finger access formed by trigger guard 47, and is pivotally mounted on pin 107 in trigger-plate 41. The trigger is provided with a forwardly extending trigger extension 108, which is biased upwardly by trigger spring 109, compressed between trigger extension 108 and base plate 42 (see Fig. 1). Disconnector 110 is pivotally mounted on trigger arm 111 by pin 112, passing through a hole in the arm 111 and, as may be seen in Fig. 15, comprises body section 113, an upturned finger portion 114, having a forward bevel 115 at its upper end, and an upwardly and inwardly extending sear contacting portion 116. A spring 117, carried on pin 118, biases the disconnector 110 to upward position, so that when the parts of the firearm are in the position shown in Fig. 1, the upper end of finger portion 114 is received within notch 85 in the bolt 70, and sear contacting portion 116 makes contact with the rear side of sear arm 103. It should be noted here that unless the bolt is in breech closing position, notch 85 will not be lined up with finger portion 114 of the disconnector, and the latter will be held down by the bolt at all times except when the bolt is completely closed. This renders the firing mechanism inoperative except in the battery position of the bolt and also prevents full automatic firing of the gun by preventing the sear arm 103 from making engagement with sear notch 92 in hammer 90 if the trigger is held by the shooter.

Figure 1:
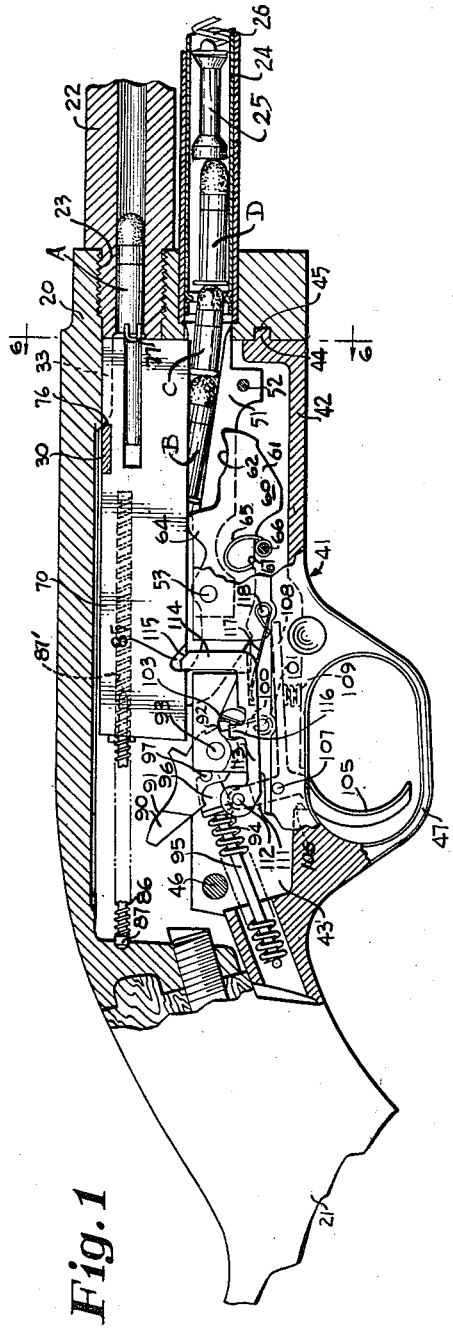
Fig. 1 is a side elevation, partially cut away, of the receiver of a rifle incorporating the present invention, showing fragmentary portions of the barrel and stock, and showing the parts of the action assembly as they appear when the rifle is ready to be fired.

Referring to Fig. 1, the rifle is shown loaded with a cartridge A, and in cocked condition, ready for firing, with the lifter arm 61 in down position, and with a cartridge B held between the guide sections 56 and 57 of throat members 50 and 51. Now when the trigger 105 is pulled rearwardly, disconnector 110 is forced forwardly, and sear contact 116, acting against sear arm 103, will force sear 100 out of engagement with sear notch 92 allowing the hammer 90 to fall forwardly to the position illustrated in Fig. 2, its striking face 91 contacting the rear end of firing pin 78 to cause cartridge A to fire. Pressures developed in barrel 22 by the explosion of the cartridge will force the cartridge and hence the bolt 70 backward, and the camming force exerted against finger 114 of disconnector 110 by the forward edge of notch 85 will force the disconnector 110 downward, moving sear contact 116 below and out of engagement with sear arm 103 to allow sear 100 to bear against the body of hammer 90 under the urging of sear spring 102.

As the bolt 70 moves backward it will reach the position illustrated in Fig. 3. Here it will be observed that the rear end of bolt 70 camming against the striking face 91 of hammer 90, has forced the hammer back into a position where the sear 100 is in position to engage sear notch 92, to hold hammer 90 in cocked position upon the return of bolt 70 to breech-closing position, assuming the shooter releases trigger 105. It will also be observed that the rear cam face 74 of cam track 72 has contacted finger portion 63 of lifter 60, rotating the latter to a position such that notch 67 is on the center line of pins 53 and 66, and that arm 61 has made contact with the next cartridge B held within the guide sections 56 and 57 of throat members 50 and 51, and has moved it upward toward its final feeding position. As the bolt 70 continues its rearward journey, finger portion 63 will be further depressed, pushing notch 67 past the center line of pins 53 and 66, at which time spring 65 will force arm 61 with the cartridge B, which had previously been held between guide sections 56 and 57, to its uppermost or cartridge feeding position, with the base of the cartridge held against further upward movement by flanges 120 and 121, which project inwardly from the upper rear portion of throat members 50 and 51, as illustrated in Figs. 4 and 5. In this position the lower part of finger 63 will abut pin 118, which acts as a stop.

Since, as has been mentioned before, throat members 50 and 51 are loosely mounted in the trigger-plate 41, they will move apart to offer little frictional resistance to the upward movement of cartridge B, which, in the position shown in Figs. 4 and 7, will be supported by lifter arm 61, against inturned flanges 120 and 121 at the upper edge of the throat members. In this position of lifter 60, the top of its cam lobe 64 will be in a plane above the lowermost tip of bolt cam track 72 and the forward edge of the arm 61 will be in a position to block the rearward passage of a following cartridge C into engagement with stop lug 58.

From its fully retracted position shown in Fig. 4, bolt 70, under the influence of return spring 86, will travel forward until the face 75 of cam track 72 contacts the upper edge of the rim of cartridge B, forcing it forward and disengaging the base of the cartridge from its contact with inturned flanges 120 and 121. This requires very little effort on the part of the bolt which is being driven by the return spring 86. As the cartridge clears the flanges, the inner faces of bolt rails 71, 71' will contact the cams 122 and 123 located on the outer sides of throat members 50 and 51, as may be seen in Figs. 5 through 7, and 13, forcing the throat members together to a position, such that the base of the cartridge will contact the upwardly sloping guide rails 124 and 125 (Figs. 13 and 14) whereby to prevent it from dropping down between the throat members 50 and 51. The cartridge is also guided in its motion from this point by cartridge guiding face 62 of lifter arm 61. Upon further forward movement of the bolt 70, cartridge B will be pushed to a position where its nose contacts guide block 33, and thence into the chamber 34 of barrel 22, guiding of the cartridge into place being further facilitated by the beveled edge of the chamber 34. Bolt 70, it will be observed, is cut away at 126 to accommodate guide block 33, when the bolt is in breech-closing position.

In the meantime, at a point about three-quarters of the way from the fully retracted position of the bolt shown in Fig. 4 to its chamber closing position as seen in Fig. 1, the forward cam face 73 of bolt cam track 72 will contact cam lobe 64 of lifter 60, rotating the latter to a position in which the notch 67 has passed the center line of pins 53 and 66, at which time the toggle action of spring 65 will take over to snap the elevator to the position illustrated in Fig. 1, in which position the base of arm 61 contacts pin 66. Follower 25 is then permitted to force the next succeeding cartridge C into position between the guide sections 56 and 57 of throat members 50 and 51, against the cartridge base contacting stop lug 58. Pressure of rails 71, 71' against the cams 122 and 123 as illustrated in Fig. 6 will, of course, hold throat members 50 and 51 together, so that the next cartridge cannot rise up between the throat members 50 and 51 and will be firmly held in position to be lifted by lifter arm 61 during the next ensuing rearward movement of the bolt 70.

Now, if pressure on trigger 105 be released, the pressure of spring 109 against trigger extension 108 will make the trigger rotate in a counterclockwise direction, causing trigger arm 111 to pull disconnector 110 backward to a position in which the forward edge of sear contact 116 is behind sear arm 103, allowing the disconnector 110 to rise upwardly under the pressure of spring 117 to place sear contact 116 in position to engage sear arm 103, since the notch 85 in the bolt is in position to receive the end of the disconnector finger 114.

As may be seen from the foregoing description, the rifle comprising this invention is simple and sturdy in construction, and, due to its positive cartridge lifting and feeding mechanism, it is able to operate over a relatively wide range of bolt speeds, both in a rearward and forward direction. This enables the rifle to fire cartridges of varying powers, provided that the weight of the movable parts and the strength of the various springs are balanced with the available blow-back energy, so that the action is light enough to enable the rifle to operate with low power ammunition, while still heavy enough to prevent excessive bolt speeds, leading to excessive shock and possible part breakage, when operating with ammunition of higher power. For example, a .22 caliber rifle embodying the invention has displayed quite satisfactory performance when operating with ammunition varying from .22 short to .22 long rifle cartridges, and developing from 17,000 p. s. i. to 24,000 p. s. i. chamber pressures, with the following part weights and spring pressures:

| | |
|---|---|
| Weight of bolt assembly_____ounces__ | 3.95 |
| Installed load of bolt return spring_____pounds__ | 2.5 |
| Increase in load per inch of bolt return spring pounds__ | 3.125 |
| Full working load of bolt return spring____do____ | 7.0 |
| Maximum static force applied to bolt face required to force lifter finger down_____pounds___ | 3.4 |
| Maximum static force applied to rear of bolt required to force lifter cam lobe down__pounds__ | 4.5 |
| Maximum static force applied to bolt face required to cam hammer down_____pounds__ | 8.0 |
| Maximum static force required to open bolt fully pounds__ | 11.1 |
| Static force required to start opening bolt__do____ | 7.5 |

The figures given here relative to the forces necessary to move the bolt under different conditions are based on static measurements, in which the friction factor is difficult to evaluate, and for that reason should be considered only as reasonably close approximations.

The foregoing data is graphically illustrated in Fig. 19 of the drawings which is a plot of bolt movement in inches against pounds of force. In the diagram, the portion of the solid line curve from E to J is a plot of the forces resisting rearward travel of the bolt during the power stroke. It is these forces which must be balanced with the available blow-back energy to permit the bolt to be retired to its full open position, while at the same time avoiding excessive bolt speed. The lower portion of the solid line curve between points K and S is a plot of the mechanical forces acting on the bolt causing it to be moved from its retired position to its fully forward or closed position. The solid line curve is a composite of the several force curves representing the significant forces exerted by the hammer spring, the action or recoil spring, the cartridge lifter spring both on retraction and again on forward movement of the bolt, and a relatively small amount of resistance offered by a cartridge being fed into the chamber by the bolt. Starting at point E, which corresponds to the condition of the gun shown in Fig. 1, the initial resistance to retraction of the bolt is the sum of the loads of the action spring and the hammer. The total mechanical resistance increases rapidly with bolt movement to a maximum at F in accordance with the increase in the hammer load, the action spring load being substantially a straight line function through its operating range. The resistance then decreases slightly after point F with decrease in hammer load to point G, at which time the bolt engages the finger 63 of the cartridge lifter. The decrease in hammer load from point G to point H more than compensates for the increase in the cartridge lifter load between those points, so that there is an overall net decrease in the resistive force during this interval of the cycle. At point H, the hammer has been fully retired by the bolt to the position shown in Fig. 4 of the drawings and thereafter the hammer exerts merely a constant friction drag on the underside of the bolt. This is shown in the hammer curve by the straight line portion at the lower right end of the curve. From point H to point I on the graph, the total mechanical force resisting rearward movement of the bolt first increases with the increase in resistance offered by the cartridge lifter as it is rotated by the bolt until the lifter reaches a position where the aforesaid toggle action occurs, at which point it snaps quickly into its other limiting position. This is represented on the curve by the sudden decrease to point I in the latter half of this portion of the curve. From point I to point J, the only forces resisting movement of the bolt are those of the action spring and the constant resistive drag offered by the hammer.

In the lower half of the curve, i. e. between points K and S, there is plotted the mechanical forces acting upon the bolt to cause it to be advanced to breech closing position. At point K such force is equal to the force exerted by the action spring, less the friction drag offered by the hammer. This remains constant to point L, at which time the bolt face engages the next cartridge to be chambered and the feeding of this cartridge into the chamber offers a small resistance varying from about 1.5 to 1.75 pounds as shown on the graph. At point M, the bolt has passed over the hammer and the latter then exerts a component of force axially of the bolt helping to push it forward, this being represented by that portion of the curve included between points M and N. At point N, the cartridge has cleared the throat assembly, eliminating this drag, and the net force then acting to close the bolt increases, being equal to the sum of the force imposed by the action spring and the hammer. This continues to point O at which point the bolt escapes the hammer, the latter being held in fully cocked position, so that the only force then acting to close the bolt is that of the action spring. At point P, the cam track 72 of the bolt engages the cam lobe 64 of the cartridge lifter. At the start of such engagement, the action spring has slightly more force than the resistance offered by the cartridge lifter, but this rapidly changes with further movement of the bolt so that at point Q the two become equal and thereafter the resistance offered by the cartridge lifter is in excess of the force exerted by the action spring to close the bolt. Between points Q and R on the curve, therefore, there is insufficient static force acting upon the bolt to complete its closing cycle, and reliance is placed upon the kinetic energy developed by the bolt during the preceding return movement to carry it through to its fully closed position. The shaded area between points Q and R on the graph, therefore, represents the energy supplied by the momentum of the bolt during its forward travel. At point R, the cartridge lifter snaps to its full downward position by the previously described toggle action, and the lifter thereafter offers no resistance so that the final increment of movement of the bolt may be accomplished by the action of the return spring alone. However, the kinetic energy at this point may be and in many instances is still sufficient to carry the bolt closed even without the aid of the return spring.

Good results have been obtained in practical tests in guns in which the strength of the bolt return or action spring is such as to give an overall maximum static force at point F on the graph of from 10 to 12 pounds. However, the most satisfactory performance has been obtained when this figure for the example given is about 11 pounds. It will also be seen from the graph that for this gun, the bolt travel from fully closed position, as shown in Fig. 1, to fully retracted position, as shown in Fig. 4, is about 1.44 inches.

An important feature of the present invention is the provision of a relatively large amount of space for substantially free travel of the bolt during its movement toward breech closing position from its rearmost position, before contacting the cartridge or cam lobe 64. This allows the bolt to pick up sufficient momentum to cam the lifter down in front and to drive the cartridge home into the chamber, without the necessity of providing a return spring heavy enough to operate the lifter by static force alone. If a spring of a strength sufficient to overcome these forces by its own power alone were used, the rifle would not operate with low-power ammunition. Thus, in the example given above, as bolt cam 72 contacts cam portion 64, the bolt is about 3/4 of the way closed, so that the static force exerted by the return spring is at best only slightly more than the initial resistance offered by the lifter, and very soon becomes far less than the maximum resistance offered by the latter, so that the return spring alone is unable to fully close the bolt. However, by providing the aforesaid substantial pre-travel of the bolt free of practically all resistance, the bolt picks up enough momentum to chamber the cartridge, and also to overcome the resistance force exerted by the lifter spring, to cam the lifter to down position. As mentioned above, the foregoing is shown graphically in Fig. 19 by the shaded area below the base line defined by the return curve. This free movement of the bolt in the present embodiment of the invention is made possible by the provision of the toggle action of the cartridge lifter 60.

Further reduction in the strength of the return spring is also made possible by the toggle action of the lifter, which substantially reduces the total work required to move the lifter down during the return stroke of the bolt. This is because the bolt only has to move the lifter a short distance before the toggle spring takes over and snaps the forward end of the lifter down to its lower limit.

Firing tests conducted with a standard commercial rifle equipped with an actuator and with a rifle manufactured according to the present invention have demonstrated clearly the superiority of the present rifle over that of the prior art. For example, in endurance tests using mixed .22 short, .22 long, and .22 long rifle cartridges of various makes, it is found that an actuator equipped rifle failed to function after only 750 rounds of firing without cleaning, whereas the rifle of the present invention, fired under the same conditions, functioned effectively for 4,750 rounds without cleaning. Furthermore, when using .22 short cartridges, the actuator-equipped rifle gave excessive gas flash-back out of the ejection port, while the present rifle was satisfactory in these respects. The reason for this, as demonstrated by the results of the tests set forth in the following table of data computed from micro-flash photographs taken during actual firing is that the actuator imparts such a high speed to the bolt, when using .22 shorts, that the spent case is extracted from the chamber prematurely, and a considerable part of the hot gases in the barrel escapes through the breech. In the present rifle, however, the slower bolt speed imparted by a .22 short cartridge allows the case to remain within the chamber until the bullet is well clear of the barrel, thus minimizing flash and gas blowback.

In the table below rifle A is a rifle according to the present invention in which the bolt return spring is of a strength such that the maximum force required to open the bolt fully was 12 pounds, and rifle B is a rifle according to the present invention in which 10 pounds was required to open the bolt. The weights of the bolt assembly and hammer, dimensions thereof, as well as the forces required to actuate the lifter, are the same in rifles A and B as in the specific example given above. This table shows the distance of rearward travel of the bolt at the instant that the bullet leaves the muzzle of the gun.

| Rifle | Cartridge | Bolt Travel, inches |
|---|---|---|
| Actuator Equipped | .22 High Speed Long Rifle | 10/32 |
| Do | .22 High Speed Short | 13/32 |
| Rifle A | .22 High Speed Long Rifle | 7/32 |
| Do | .22 High Speed Short | 4/32 |
| Rifle B | .22 High Speed Long Rifle | 12/32 |
| Do | .22 High Speed Short | 9/32 |

Since the length of a long rifle case is approximately 18/32" and that of a short is about 12/32", it may be seen from the foregoing that in rifles embodying the present invention the bullet is well clear of the muzzle before the spent casing is fully extracted from the chamber, whereas in the actuator-equipped rifle, when firing .22 shorts, the spent casing is fully extracted from the chamber before the bullet has cleared the muzzle, with consequent production of objectionable hot gas flash-back.

What is claimed is:

A semi-automatic firearm for indiscriminately firing high-power and low-power cartridges of the same caliber which includes in combination a barrel having a cartridge chamber; a receiver secured to said barrel; a bolt reciprocably movable in said receiver to and from chamber closing position; a return spring acting between said receiver and said bolt; said bolt being powered during its opening travel away from chamber closing position by gas pressure in the chamber on firing of a cartridge whereby it deflects said return spring, and being powered during its closing travel towards chamber closing position by said deflected return spring; firing means including a hammer and hammer spring cocked by said bolt during its opening travel and loading said bolt most heavily during the early portion of its opening travel; a cartridge magazine for feeding cartridges into said receiver; a cartridge lifter pivoted within said receiver between a cartridge receiving position and a cartridge feeding position for transferring cartridges from said magazine to a position where they are fed into said chamber by said bolt during the closing stroke thereof, means for limiting the pivotal movement of said lifter; and a lifter spring having a bearing point on said receiver and engaging said cartridge ltifter so as to exert a force thereon which is directed to one side of a line between the pivot point of said lifter and the bearing point of said lifter spring when said lifter is pivoted to one of its limits of movement and to the other side of said line when the lifter is pivoted to its other limit of movement whereby the lifter is biased by said lifter spring to each of its limits of movement; said lifter including a first operating element engageable by a rear cam surface on the bolt during its opening stroke to pivot it toward its cartridge feeding position, and also including a second operating element engageable by a forward cam surface on the bolt during its closing stroke for positively pivoting said lifter to a position where said lifter spring urges it to its cartridge receiving position, the force of the deflected return spring on the bolt when said forward cam surface engages said second operating element being insufficient by itself to overcome the urge of said lifter spring, said forward cam surface on the bolt when the latter is fully retracted being spaced from said second operating element on the lifter a distance equal to a major portion of the stroke of the bolt whereby said bolt is permitted substantially free travel over a large portion of its return stroke so that the momentum of said bolt under the urge of said return spring is sufficient to overcome the lifter spring and to move said bolt to chamber closing position.

References Cited in the file of this patent

UNITED STATES PATENTS

| | | |
|---|---|---|
| 1,322,053 | Reising | Nov. 18, 1919 |
| 2,296,242 | Brewer | Sept. 22, 1942 |
| 2,425,412 | Barnes | Aug. 12, 1947 |
| 2,552,429 | Humeston | May 8, 1951 |
| 2,565,688 | Horan | Aug. 28, 1951 |